I. T. VON RISCH.
FUSE FOR ORDNANCE SHELLS.
APPLICATION FILED AUG. 23, 1910.
984,607.
Patented Feb. 21, 1911.
3 SHEETS—SHEET 1.
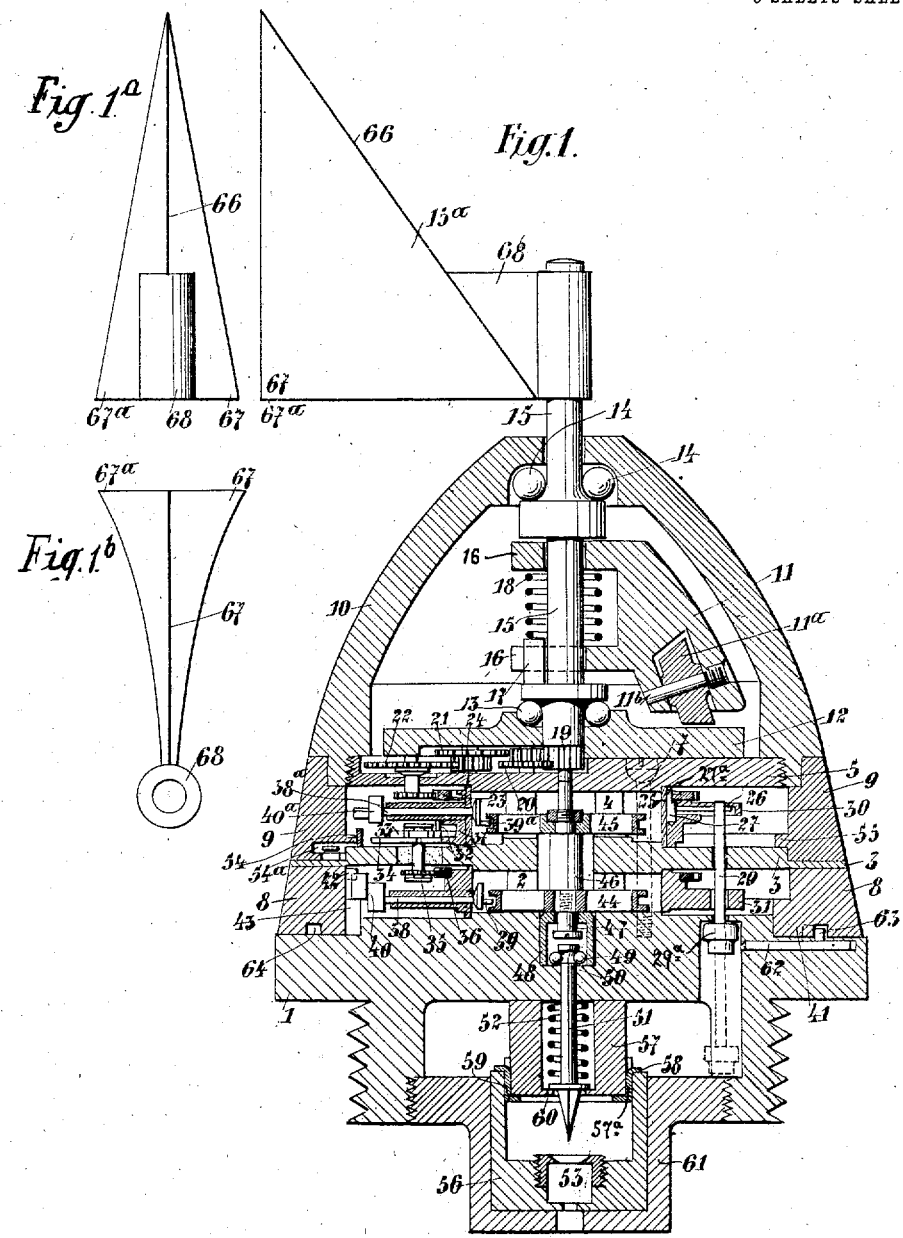
Witnesses
A. Morrill
S. Ford
Inventor
Isidor Theodor von Risch.
By R. Hadden
Attorney

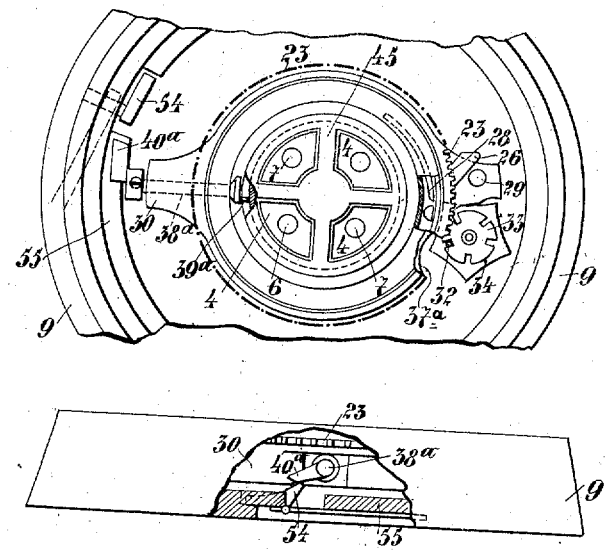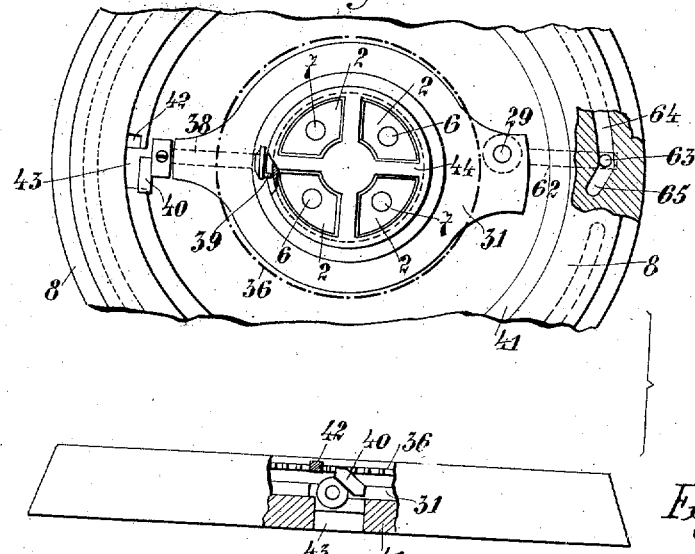

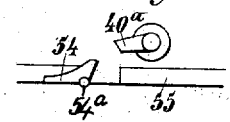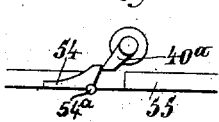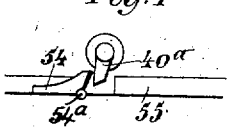
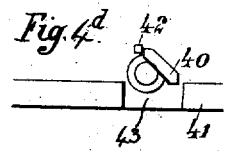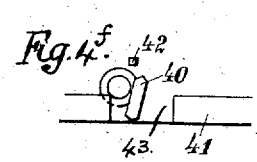
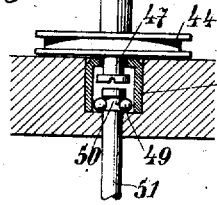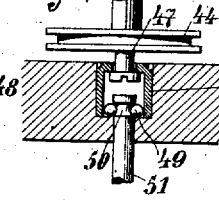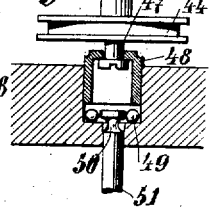
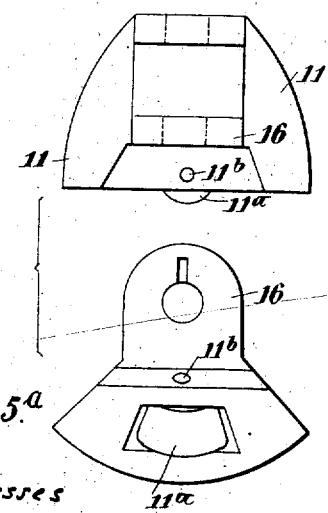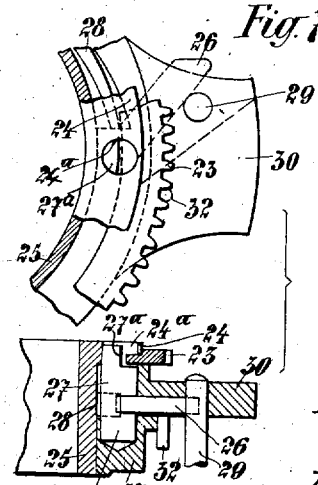

UNITED STATES PATENT OFFICE.

ISIDOR THEODOR VON RISCH, OF VIENNA, AUSTRIA-HUNGARY.

FUSE FOR ORDNANCE-SHELLS.

984,607.  Specification of Letters Patent.  Patented Feb. 21, 1911.

Application filed August 23, 1910. Serial No. 578,500.

*To all whom it may concern:*

Be it known that I, ISIDOR THEODOR VON RISCH, a subject of the Emperor of Austria-Hungary, residing at Vienna, in Austria-Hungary, have invented a certain new and useful Improvement in Fuses for Ordnance-Shells, of which the following is a specification.

The object of this invention is to provide an improved mechanical fuse for ordnance shells, which is adjustable for shrapnel and grenade practice, and also for timed case-shot.

The invention embodies certain principles designed to render the fuse mechanism independent of the somewhat obscure nutational and precessional effects, which occur in the course of the projectile's flight and have heretofore been the cause of the practical failure of mechanical time-fuses other than those embodying clock-work.

The invention is differentiated from previously devised fuses depending for their action on the rotation of the projectile, by a vane used in combination with a brake-device and special timing and actuating mechanism, whereby exceptional precision and smoothness of action are obtained, with consequent reduction of dispersal.

The fuse depends for its action on the rotation of the projectile about a device, rotation of which is prevented by the aforesaid vane and brake.

An embodiment of the invention is illustrated in the annexed drawings, in which—

Figure 1 is a central longitudinal section of the fuse, before firing, Fig. 1ª an elevation of the vane, viewed from the pivot thereof, and Fig. 1ᵇ a plan view of the vane. Fig. 2 is a cross-section, partly broken away, showing the mechanism inclosed by one of the time rings, and Fig. 2ª a side-view of this time ring, partly broken to expose mechanism therein. Fig. 3 is a broken cross-section of another time-ring, and Fig. 3ª a side-view thereof, partly broken away. Figs. 4ª, 4ᵇ and 4ᶜ represent a detail of the actuating mechanism in three different positions, and Figs. 4ᵈ to 4ᶠ show two other details in the corresponding positions. Fig. 5 is a side-view of the brake-device, and Fig. 5ª a rear view thereof. Fig. 6 shows another position of the device illustrated in Figs. 4ª to 4ᶜ. Fig. 7 shows part of the actuating mechanism, and Fig. 7ª is a cross-section of Fig. 7.

The base 1 of the case containing the fuse mechanism has a slotted boss 2 which supports a disk 3 having a slotted boss 4 abutting against a disk 5, the latter being connected to the base 1 by pins 6 and screws 7. Time rings 8 and 9 separated from each other by the disk 3 form the walls of the case between the base 1 and the cap or shell-nose 10, the latter being screwed to the disk 5. The cap 10 contains the brake-block 11, shown in Figs. 5 and 5ª. This brake-block has a recess containing a beveled roller 11ª rotatable on a spindle 11ᵇ. The roller 11ª protrudes from the under or rear surface of the block, within a short distance of a plate 12 fixed to the disk 5. The block has two perforated lugs 16, by means of which it is slidably mounted on a spindle 15 working on ball bearings 13 and 14, rotation of the block relative to the spindle being prevented by a pin 17 which is fixed to a collar on the spindle and enters a slot in one of the lugs. A coiled spring 18 interposed between the pin 17 and the front lug 16 normally holds the brake block in the position in which it is shown in Fig. 1, with roller 11ª clear of the plate 12.

To the front end of the spindle 15, outside the cap 10, there is fixed a wedge-shaped vane 15ª, and to the rear end of the spindle is fixed a pinion 19 connected by a train of gear wheels 20, 21, 22 to a toothed ring 23 rotatably engaged with a flange 24 of a rotatable cylinder 25 between the disks 3 and 5.

The pivot 27 of a single-armed lever 26 (Figs. 2 and 7) has a semi-circular prolongation 27ª located within a circular hole 24ª in the flange 24. A portion of the ring 23 lies behind the hole 24ª, covering a little less than half thereof, so that by rotating the pivot 27 the prolongation 27ª can be pressed against the inner edge of the ring 23, but the lever 26 is normally thrust against a pin 29 by a spring 28, and in this position the prolongation 27ª of the pivot is not in contact with the ring 23.

The front end of the pin 29 traverses a hole in a rotatable time ring 30 surrounding the cylinder 25. This ring 30 carries a pin 32 adapted to engage a notched wheel 33, to the spindle of which are fixed a Geneva stop-wheel 34 and a pinion 35. The latter meshes with an annular rack 36 fixed to a time ring 31, which has a hole traversed by the pin 29. The stop-wheel 34 slidably engages a ring 37, except where the latter has a recess 37ᵃ, enabling the stop wheel to be rotated by the pin 32 when it is opposite this recess. The ring 31 has a radial channel containing a spindle 38 with a crank 39 fixed to its inner end and a cam 40 fixed to its outer end. The cam 40 slides on a flange 41 of the ring 8 hereinbefore mentioned, until it strikes an abutment 42, which is fixed to said ring and causes the spindle 38 to rotate and the cam 40 to enter a recess 43 in the flange (Figs. 4ᵈ to 4ᶠ).

The bosses 2 and 4 have slots which radiate from central bores and contain the spokes of wheels 44 and 45 respectively (Figs. 2 and 3). These wheels are grooved at their circumferences and are fixed to an axially slidable spindle 46, the front end of which has bearing in the disk 5. The groove in the wheel 44 is engaged by the pin of the crank 39, and the groove in the wheel 45 is engaged by the pin of a crank 39ᵃ fixed to a spindle 38ᵃ, which is mounted in the ring 30 and carries a cam 40ᵃ. A screw 47 is screwed to the rear end of the spindle 46, and a socket 48 is slidable on a smooth portion of the shank of this screw, said socket containing a ring of balls 49 engaging an annular groove 50 in the percussion pin 51. A spring 52 coiled on the percussion pin tends to thrust same toward the percussion cap 53.

When the cam 40 rotates the spindle 38 the crank 39 lifts the wheels 44 and 45, and the wheel 45 rotates the cam 40ᵃ into position to abut against a bell crank 54, which pivoted at 54ᵃ is a flange 55 of the ring 9, and is held in position by a spring. By this means the spindle 38ᵃ is rotated, and the cam 40ᵃ then slides on the flange 55.

The hammer mechanism comprises a socket or anvil 56 fitted into a cap 61 screwed to the base 1, and a tubular piece 57 surrounding the spring 52 and supported against the base 1 by a flange 59 of a copper ring 57ᵃ, which has a flange 58 resting upon the socket 56. The pin 51 has a collar thrust by the spring 52 against a flange 60 of the tubular piece 57.

The pin 29 has at its rear end a head 29ᵃ tapered for engagement with a radially slidable pin 62, which has a projection 63 protruding into a groove 64 in the ring 8. The latter can be rotated by means of a key, and by rotating it into a certain position the projection 63 is caused to enter an inwardly directed prolongation 65 of the groove 64, whereby the pin 62 is thrust inward to engage the head 29ᵃ and prevent movement of the pin 29 into the position indicated by dotted lines in Fig. 1. This adjustment is made when the fuse is to act solely by impact.

The vane 15ᵃ is fixed to the spindle 15 by a web 68 and has two triangular sides meeting at an edge 66, which lies in a plane longitudinally bisecting the shell, and makes with the axis of the shell an angle which is open in the direction of the trajectory. The sides curve outward from said edge 66 to the rear corners 67 and 67ᵃ remote from the axis, so that during the flight of the projectile air is compressed at the sides of the vane. This compression assists in preventing rotation of the vane.

The toothed gear is so proportioned that 100 revolutions of the spindle 15 produce one revolution of the toothed ring 23 and ring 30, whereby the ring 36 and cam 40 are moved through a certain angle by means of the pin 32 and pinion 35.

The action of the mechanism is as follows:—When the shell is fired from the gun the pin 29 (if not locked by the pin 62) assumes by inertia the position indicated in Fig. 1 by dotted lines, and releases lever 26, so that the latter is rotated by spring 28, whereby one edge of the part 27ᵃ is pressed against the toothed ring 23, and couples the driving mechanism with the timing and actuating mechanism. While the projectile has acceleration the roller 11ᵃ is thrust against the plate 12, by the inertia of the brake 11, and revolves on said plate, but prevents rotation of the brake. When the acceleration ceases the brake 11 is thrust forward by spring 18.

By rotation of the gears 20, 21, 22 about the pinion 19 the gear-train is driven and imparts rotation to the ring 30 and cam 40ᵃ. At each revolution the pin 32 rotates the stop-wheel 34, pinion 35 and ring 31, so that the cam 40 is advanced along the flange 41. After a certain number of revolutions, depending on the adjustment of the time-rings, the cam 40 is rotated by the abutment 42, and causes the crank 39 to move the wheel 44 into the position shown in Fig. 4ʰ, together with the wheel 45, whereby the cam 40ᵃ is rotated into the position shown in Fig. 4ᵇ. At the next revolution the cam 40ᵃ slides on to the abutment 54, and the crank 39ᵃ moves the wheel 45 and spindle 46 so that the screw 47 pulls the socket 48 clear of the balls 49 (Fig. 4ⁱ), thus releasing the percussion pin 51. The spring 52 forces the pin and part 57 into the part 56, and explodes the percussion cap.

Fig. 6 shows the position of cam 40ᵃ when the time ring 9 is adjusted for the cam to act after 99, 199, 299, etc., revolutions of the shell, the cam 40 being then in the position in which it is shown in Fig. 4ᵉ.

What I claim as my invention and desire to secure by Letters Patent of the United States is:—

1. An ordnance shell fuse comprising, in combination with an automatic hammer, a device for restraining said hammer from action, means for disabling said restraining device, a rotatable spindle coaxial with the shell, mechanism actuatable by said spindle for actuating said disabling means, a vane fixed to said spindle and exposed to the wind of the shell, a brake device slidable but not rotatable on said spindle, said brake device comprising a roller, an abutment surface for said roller at the rear of the brake-device and transverse to the spindle, and a spring which acts on said brake and normally holds said roller out of contact with said abutment surface but is overcome by the inertia of the slidable brake while the shell is gaining speed, said vane and brake coacting to prevent rotation of the spindle with the shell.

2. An ordnance shell fuse comprising, in combination with an automatic hammer, a device for restraining said hammer from action, means for disabling said restraining device, a rotatable spindle coaxial with the shell, mechanism actuatable by said spindle for actuating said disabling means, a vane fixed to said spindle and exposed to the wind of the shell, said vane having symmetrical concave lateral surfaces converging toward an edge which makes an angle with the spindle axis open in the direction of flight, a brake device slidable but not rotatable on said spindle, said brake device comprising a roller, an abutment surface for said roller at the rear of the brake-device and transverse to the spindle, and a spring which acts on said brake and normally holds said roller out of contact with said abutment surface but is overcome by the inertia of the slidable brake while the shell is gaining speed, said vane and brake coacting to prevent rotation of the spindle with the shell.

3. An ordnance shell fuse comprising, in combination with an automatic hammer, a device for restraining said hammer from action, means for disabling said restraining device, a rotatable spindle coaxial with the shell, mechanism actuatable by said spindle for actuating said disabling means, a vane fixed to said spindle and exposed to the wind of the shell, said vane having symmetrical concave lateral surfaces converging toward an edge which makes an angle with the spindle axis open in the direction of flight, said lateral surfaces diverging from each other toward two corners at the rear of the vane, remote from the spindle, a brake device slidable but not rotatable on said spindle, said brake device comprising a roller an abutment surface for said roller at the rear of the brake-device and transverse to the spindle, and a spring which acts on said brake and normally holds said roller out of contact with said abutment surface but is overcome by the inertia of the slidable brake while the shell is gaining speed, said vane and brake coacting to prevent rotation of the spindle with the shell.

4. An ordnance shell fuse comprising, in combination with an automatic hammer, a device for restraining said hammer from action, means for disabling said restraining device, a rotatable spindle coaxial with the shell, regulatable time mechanism actuatable by said spindle for actuating said disabling means, a vane fixed to said spindle and exposed to the wind of the shell, a brake device slidable but not rotatable on said spindle, said brake device comprising a roller, an abutment surface for said roller at the rear of the brake-device and transverse to the spindle, and a spring which acts on said brake and normally holds said roller out of contact with said abutment surface but is overcome by the inertia of the slidable brake while the shell is gaining speed, said vane and brake coacting to prevent rotation of the spindle with the shell.

5. An ordnance shell fuse comprising, in combination with an automatic hammer, a device for restraining said hammer from action, means for disabling said restraining device, a rotatable spindle coaxial with the shell, regulatable time mechanism actuatable by said spindle for actuating said disabling means, said regulatable time mechanism comprising movable cams and independently movable time rings having abutments adjustable in the paths of said cams, a vane fixed to said spindle and exposed to the wind of a shell, a brake device slidable but not rotatable on said spindle, said brake device comprising a roller, an abutment surface for said roller at the rear of the brake-device and transverse to the spindle, and a spring which acts on said brake and normally holds said roller out of contact with said abutment surface but is overcome by the inertia of the slidable brake while the shell is gaining speed, said vane and brake coacting to prevent rotation of the spindle with the shell.

6. An ordnance shell fuse comprising, in combination with an automatic hammer, a device for restraining said hammer from action, means for disabling said restraining device, a rotatable spindle coaxial with the shell, regulatable time mechanism actuatable by said spindle for actuating said disabling means, said regulatable time mechanism comprising movable cams and independently movable time rings having abutments adjustable in the paths of said cams, a disk separating said time-rings, a vane fixed to said spindle and exposed to the wind of the shell, a brake device slidable but not rotatable on said spindle, said brake device comprising a roller, an abutment surface for said roller at the rear of the brake-device and transverse to the spindle, and a spring which acts on said brake and normally holds said roller out of contact with said abutment surface but is overcome by the inertia of the slidable brake while the shell is gain ing speed, said vane and brake coacting to prevent rotation of the spindle with the shell.

7. An ordnance shell fuse comprising in combination an automatic hammer having an annular constriction, a hammer restraining device comprising a ring of balls and a slidable socket adapted to hold said balls in said annular constriction, means for disabling said restraining device by moving said socket, a rotatable spindle coaxial with the shell, mechanism actuatable by said spindle for actuating said disabling means, a vane fixed to said spindle and exposed to the wind of the shell, a brake device slidable but not rotatable on said spindle, said brake device comprising a roller, an abutment surface for said roller at the rear of the brake-device and transverse to the spindle, and a spring which acts on said brake and normally holds said roller out of contact with said abutment surface but is overcome by the inertia of the slidable brake while the shell is gaining speed, said vane and brake coacting to prevent rotation of the spindle with the shell.

8. An ordnance shell fuse comprising in combination an automatic hammer having an annular constriction, a hammer restraining device comprising a ring of balls and a slidable socket adapted to hold said balls in said annular constriction, a rotatable driving spindle coaxial with the shell, a vane fixed to said driving spindle and exposed to the wind of the shell, cam-spindles, means whereby said driving spindle rotates said cam-spindles about the axis of the driving spindle, adjustable cam-actuating abutments in the paths of the cams, means connecting said cam spindles to the slidable socket so that by collective actuation of the cams the socket is displaced to release the balls, a brake device slidable but not rotatable on said spindle, said brake device comprising a roller, an abutment surface for said roller at the rear of the brake-device and transverse to the spindle, and a spring which acts on said brake and normally holds said roller out of contact with said abutment surface but is overcome by the inertia of the slidable brake while the shell is gaining speed, said vane and brake coacting to prevent rotation of the spindle with the shell.

9. An ordnance shell fuse comprising, in combination with an automatic hammer a device for restraining said hammer from action, means for disabling said restraining device, a rotatable spindle coaxial with the shell, regulatable time mechanism actuatable by said spindle for actuating said disabling means, said time mechanism comprising a Geneva stop-wheel releasable and actuatable at intervals by the spindle, a vane fixed to said spindle and exposed to the wind of the shell, a brake device slidable but not rotatable on said spindle, said brake device comprising a roller, an abutment surface for said roller at the rear of the brake-device and transverse to the spindle, and a spring which acts on said brake and normally holds said roller out of contact with said abutment surface but is overcome by the inertia of the slidable brake while the shell is gaining speed, said vane and brake coacting to prevent rotation of the spindle with the shell.

10. An ordnance shell fuse comprising, in combination with an automatic hammer, a device for restraining said hammer from action, means for disabling said restraining device, a rotatable spindle coaxial with the shell, mechanism actuatable by said spindle for actuating said disabling means, means for locking the mechanism actuatable by the spindle, a vane fixed to said spindle and exposed to the wind of the shell, a brake device slidable but not rotatable on said spindle, said brake device comprising a roller, an abutment surface for said roller at the rear of the brake-device and transverse to the spindle, and a spring which acts on said brake and normally holds said roller out of contact with said abutment surface but is overcome by the inertia of the slidable brake while the shell is gaining speed, said vane and brake coacting to prevent rotation of the spindle with the shell.

11. An ordnance shell fuse comprising, in combination with an automatic hammer, a device for restraining said hammer from action, means for disabling said restraining device, a rotatable spindle coaxial with the shell, mechanism actuatable by said spindle for actuating said disabling means, an automatic clutch for rendering operative said mechanism actuatable by the spindle, a device which normally restrains said clutch but is rendered inoperative by inertia when the shell is fired, a vane fixed to said spindle and exposed to the wind of the shell, a brake device slidable but not rotatable on said spindle, said brake device comprising a roller, an abutment surface for said roller at the rear of the brake-device and transverse to the spindle, and a spring which acts on said brake and normally holds said roller out of contact with said abutment surface but is overcome by the inertia of the slidable brake while the shell is gaining speed, said vane and brake coacting to prevent rotation of the spindle with the shell.

12. An ordnance shell fuse comprising, in combination with an automatic hammer, said hammer comprising a spring-pressed percussion pin engaged with a movable percussion member, a device for restraining said hammer from action, means for disabling said restraining device, a rotatable spindle coaxial with the shell, mechanism actuatable by said spindle for actuating said disabling means, a vane fixed to said spindle and exposed to the wind of the shell, a brake device slidable but not rotatable on said spindle, said brake device comprising a roller, an abutment surface for said roller at the rear of the brake-device and transverse to the spindle, and a spring which acts on said brake and normally holds said roller out of contact with said abutment surface but is overcome by the inertia of the slidable brake while the shell is gaining speed, said vane and brake coacting to prevent rotation of the spindle with the shell.

In witness whereof I have signed this specification in the presence of two witnesses.

ISIDOR THEODOR VON RISCH.

Witnesses:
JULIUS FLEISCHER,
CHARLES LÖSCH.